(12) United States Patent
Li

(10) Patent No.: US 9,725,107 B2
(45) Date of Patent: Aug. 8, 2017

(54) FOLDABLE STROLLER FRAME

(71) Applicant: Wonderland Nurserygoods Company Limited, Kwai Chung (HK)

(72) Inventor: Jian-Qun Li, Guandong (CN)

(73) Assignee: Wonderland Nurserygoods Company Limited, Kwai Chung (HK)

( * ) Notice: Subject to any disclaimer, the term of this patent is extended or adjusted under 35 U.S.C. 154(b) by 0 days.

(21) Appl. No.: 15/181,840

(22) Filed: Jun. 14, 2016

(65) Prior Publication Data

US 2016/0288814 A1   Oct. 6, 2016

Related U.S. Application Data

(62) Division of application No. 14/673,193, filed on Mar. 30, 2015, now abandoned.

(30) Foreign Application Priority Data

Mar. 31, 2014  (CN) .......................... 2014 1 0127407

(51) Int. Cl.
| | | |
|---|---|---|
| *B62B 3/00* | (2006.01) | |
| *B62B 7/08* | (2006.01) | |
| *B62B 7/06* | (2006.01) | |
| *B62B 9/20* | (2006.01) | |
| *B62B 9/12* | (2006.01) | |

(52) U.S. Cl.
CPC .............. *B62B 7/086* (2013.01); *B62B 7/062* (2013.01); *B62B 7/064* (2013.01); *B62B 7/068* (2013.01); *B62B 7/08* (2013.01); *B62B 9/206* (2013.01); *B62B 9/12* (2013.01)

(58) Field of Classification Search
CPC  B62B 7/064; B62B 7/08; B62B 7/068; B62B 7/06; B62B 7/062; B62B 7/066; B62B 7/086; B62B 9/206; B62B 2205/00; B62B 2205/02; B62B 2205/04; B62B 2205/06; B62B 2205/20; B62B 2205/24

See application file for complete search history.

(56) References Cited

U.S. PATENT DOCUMENTS

| | | | | |
|---|---|---|---|---|
| 3,836,164 | A * | 9/1974 | Sugino et al. ................ | 280/642 |
| 5,622,376 | A * | 4/1997 | Shamie ........................ | 280/642 |
| 6,428,034 | B1 * | 8/2002 | Bost ............................. | 280/650 |
| 6,843,499 | B2 * | 1/2005 | Guo ............................. | 280/642 |
| 7,571,926 | B2 * | 8/2009 | Huang ......................... | 280/647 |
| 8,113,534 | B2 * | 2/2012 | Cheng ......................... | 280/649 |
| 8,186,706 | B2 * | 5/2012 | Dotsey ........................ | 280/647 |
| 8,733,787 | B2 * | 5/2014 | Wang .......................... | 280/658 |
| 8,905,428 | B2 * | 12/2014 | Schroeder et al. .......... | 280/650 |
| 9,168,939 | B2 * | 10/2015 | Gu et al. | |
| 2002/0171227 | A1 * | 11/2002 | Eguchi et al. ............... | 280/650 |
| 2009/0008909 | A1 * | 1/2009 | Kassai et al. ................ | 280/658 |

* cited by examiner

*Primary Examiner* — James M Dolak
(74) *Attorney, Agent, or Firm* — Brinks Gilson & Lione

(57) ABSTRACT

A foldable stroller frame includes a connection unit interconnecting two opposite foldable side frame units, each of which includes a front leg and a handle rod connected pivotally to each other, and a rear leg connected pivotally to the handle rod. The connection unit includes four bottom rods each having a first end connected pivotally to a connecting seat, and a second end connected pivotally to a respective one of the front and rear legs of the side frame units. When the connecting seat is pulled upwardly from a lower used position, the second ends of the bottom rods move radially toward each other, whereby the side frame units are folded and move toward each other.

4 Claims, 10 Drawing Sheets

FOLDABLE STROLLER FRAME

CROSS-REFERENCE TO RELATED APPLICATION

This application is a division of U.S. patent application Ser. No. 14/673,193 filed on Mar. 30, 2015, which claims priority of Chinese Patent Application No. 201410127407.0, filed on Mar. 31, 2014.

FIELD OF THE INVENTION

The invention relates to a foldable stroller, and more particularly to a foldable stroller frame that can be folded by an operator using only one hand.

BACKGROUND OF THE INVENTION

A conventional stroller can usually be extended into an unfolded state for use and for giving toddlers a ride, or folded into a folded state for storage. When a user intends to fold the conventional stroller from the unfolded state to the folded state, a folding structure of the conventional stroller may only be operated with the user's hands after the toddler riding in the stroller has been taken away. However, if the toddler has yet to learn walking or standing alone, the user usually needs to hold the toddler in one hand and operate the folding structure with the remaining hand, which is relatively inconvenient. Therefore, there is still room for improvement in the above technique.

SUMMARY OF THE INVENTION

Therefore, an object of the present invention is to provide a foldable stroller frame that can be easily folded or unfolded by an operator with only one hand.

According to the present invention, a foldable stroller frame comprises:
 two opposite foldable side frame units spaced apart from each other in a widthwise direction of the stroller frame, each of the side frame units including
  a front leg,
  a handle rod having a pivot end that is connected pivotally to the front leg, and a handle end opposite to the pivot end, and
  a rear leg having an upper end that is connected pivotally to the handle rod; and
 a foldable connection unit interconnecting the side frame units and including
  a connecting seat, and
  two hollow front bottom rods and two hollow rear bottom rods arranged radially a round the connecting seat, each of the front and rear bottom rods having a first end that extends into and is connected pivotally to the connecting seat, and a second end that is opposite to the first end, the second end of each of the front bottom rods being connected pivotally to the front leg of a respective one of the side frame units, the second end of each of the rear bottom rods being connected pivotally to the rear leg of a respective one of the side frame units.

To unfold the stroller frame, the connecting seat is pushed downwardly to a used position so as to drive the second ends of the front and rear bottom rods to move radially away from each other such that the side frame units are driven by the front and rear bottom rods to move away from each other in the widthwise direction, such that the front leg and the handle rod of each of the side frame units pivot away from each other and such that the rear leg and the handle rod of each of the side frame units pivot away from each other.

To fold the stroller frame, the connecting seat is pulled upwardly from the used position so as to drive the second ends of the front and rear bottom rods to move radially toward each other such that the side frame units are driven by the front and rear bottom rods to move toward each other in the widthwise direction, such that the front leg and the handle rod of each of the side frame units pivot toward each other and such that the rear leg and the handle rod of each of the side frame units pivot toward each other.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
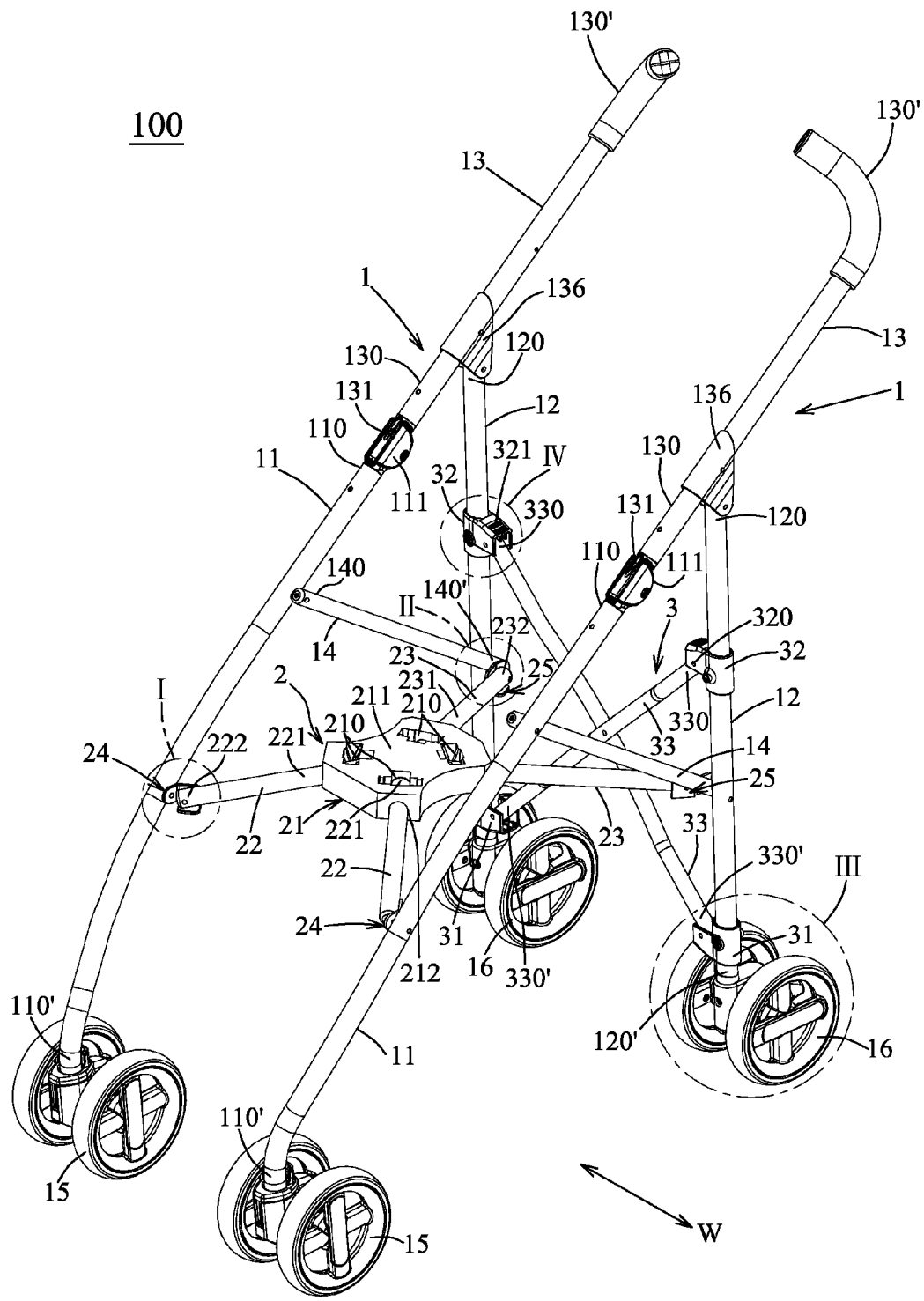
FIG. 1 is a perspective view showing the first embodiment of a foldable stroller frame according to the present invention when in a fully unfolded state.

Before the present invention is described in greater detail, it should be noted herein that like elements are denoted by the same reference numerals throughout the disclosure.

Figure 2:
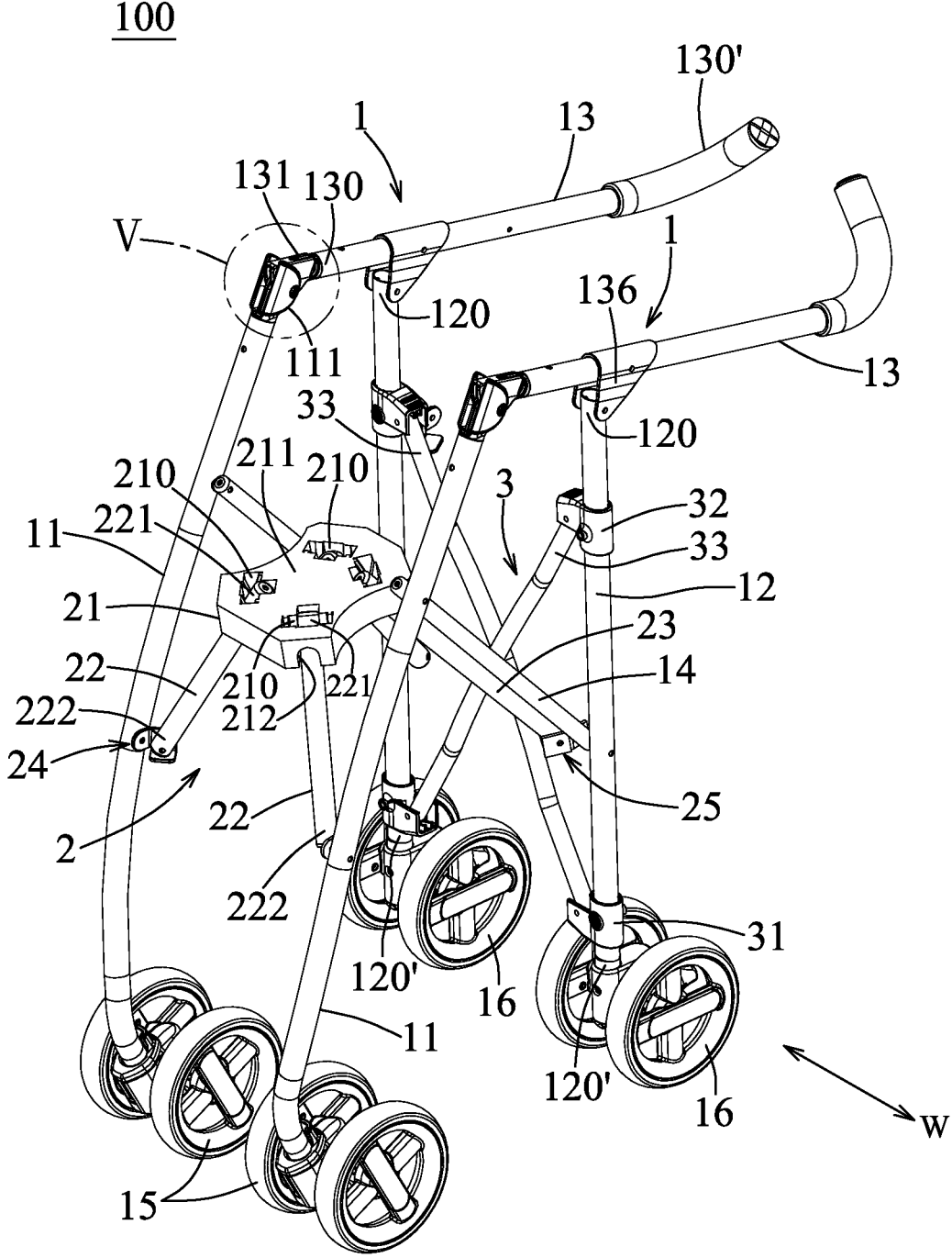
FIG. 2 is a perspective view showing the first embodiment when in a semi-folded state.
Figure 3:
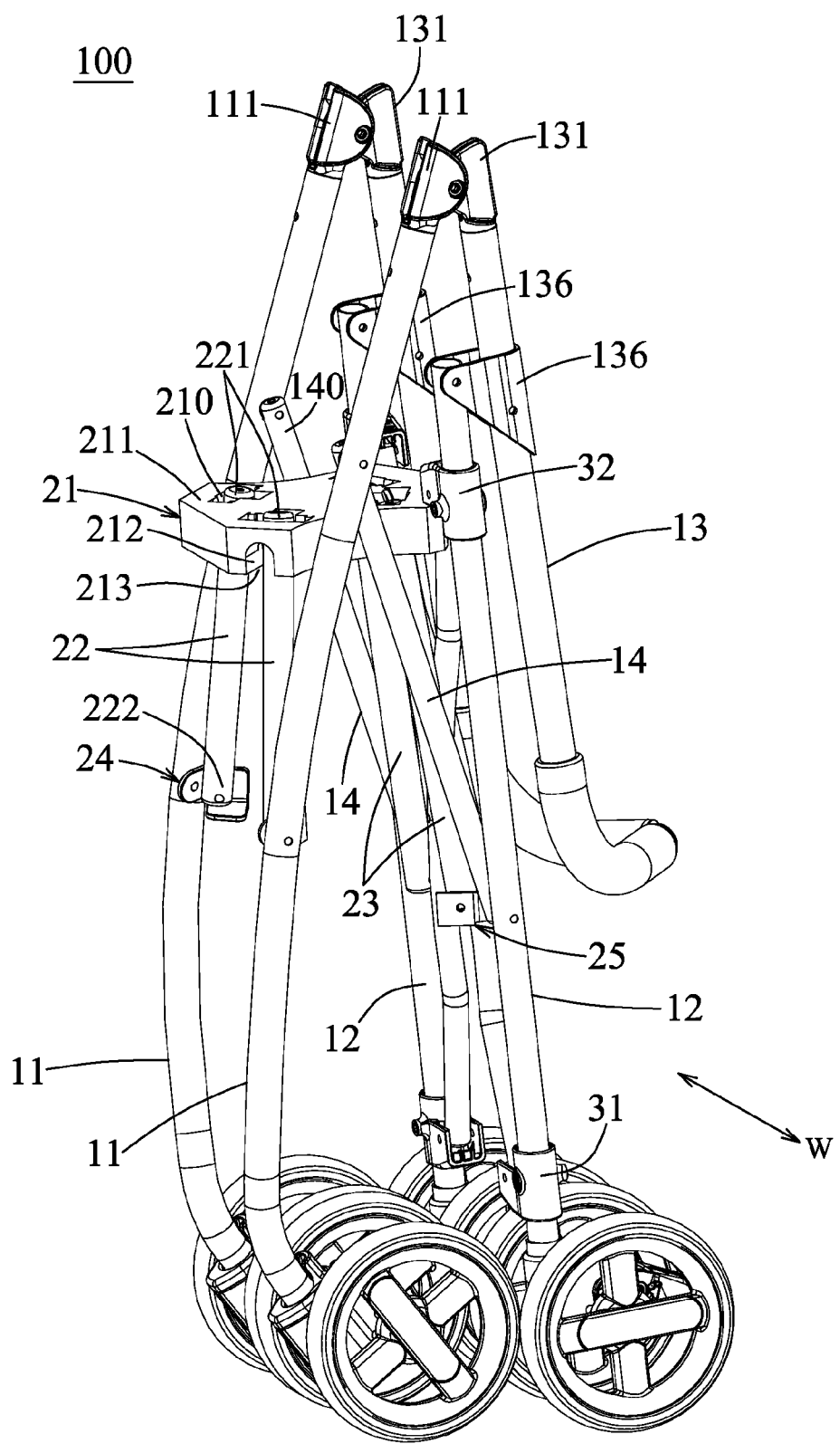
FIG. 3 is a perspective view showing the first embodiment when in a fully folded state.

Referring to FIGS. 1 to 3, the first embodiment of a foldable stroller frame 100 according to the present invention is shown to include two opposite foldable side frame units 1, a foldable connection unit 2, and a foldable rear rod assembly 3.

The side frame units 1 are spaced apart from each other in a widthwise direction (W) of the stroller frame 100. Each side frame unit 1 includes a front leg 11, a handle rod 13, a rear leg 12 and a connecting rod 14. The front leg 11 and the handle rod 13 are connected pivotally to each other through, for example, a first pivot piece 111 and a second pivot piece 131. The handle rod 13 and the rear leg 12 are connected pivotally to each other through, for example, a pivot seat 136.

Figure 2A:
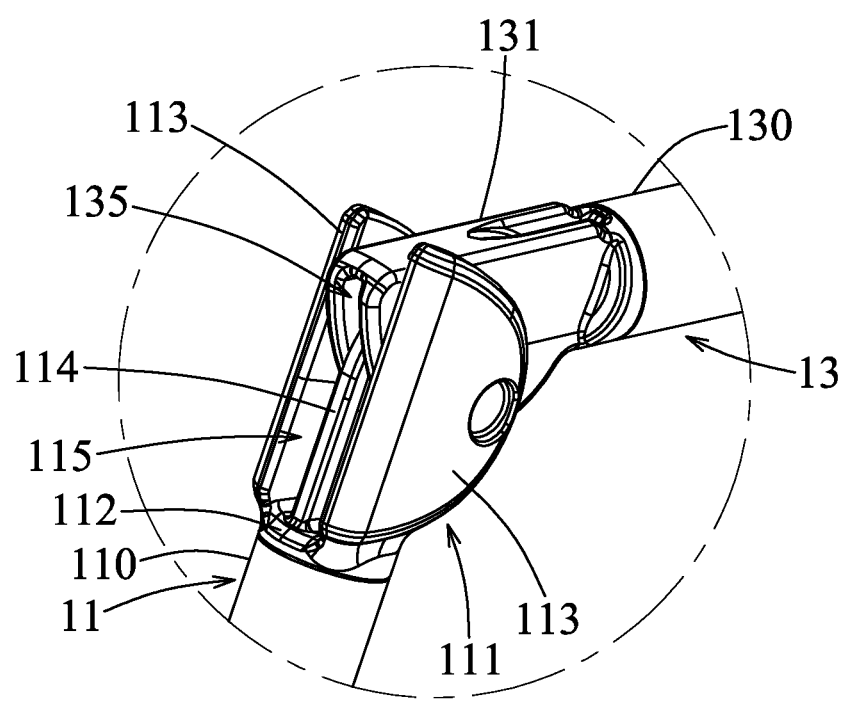
FIG. 2a is an enlarged perspective view of an encircled portion V of FIG. 2.

For each side frame unit 1, the front leg 11 has an upper end 110 provided with the first pivot piece 111 thereon, and a lower end 110' adapted to be connected to a first stroller wheel 15. Referring to FIG. 2a, the first pivot piece 111 has a base portion 112 that is connected to the upper end 110 of the front leg 11, two opposite lug portions 113 that are connected to the base portion 112 to define a receiving space 115 therebetween, and a tongue 114 that extends from the base portion 112 into the receiving space 115. The handle rod 13 has a pivot end 130 provided with the second pivot piece 131 thereon, and a handle end 130' (see FIG. 1) opposite to the pivot end 130. The second pivot piece 131 is disposed between and pivoted to the lug portions 113 of the first pivot piece 111, and is formed with a central slot 135. Thus, the second pivot piece 131 can pivot with respect to the first pivot piece 111 so as to come into the receiving space 115 until the tongue 114 of the first pivot piece 111 is fully inserted into and restricted in the central slot 135 in the second pivot piece 131. As a result, the handle rod 13 is fully unfolded relative to the front leg 11. Referring back to FIG. 1, the pivot seat 136 is sleeved on and fixed to the handle rod 13. The rear leg 12 has an upper end 120 pivoted to the pivot seat 136, and a lower end 120' opposite to the upper end 120 and adapted to be connected to a second stroller wheel 16. The connecting rod 14 has opposite upper and lower ends 140, 140' that are connected pivotally and respectively to the front and rear legs 11, 12.

The connection unit 2 interconnects the side frame units 1, and includes a connecting seat 21, two hollow front bottom rods 22, two hollow rear bottom rods 23, two front joint pieces 24, and two rear joint pieces 25.

The connecting seat 21 has, for example, four spaced apart and radially extending insertion grooves 212 (only one is shown in FIGS. 1 to 3) that are formed in an outer surrounding side thereof and that are arranged in a centrally symmetric manner. Each insertion groove 212 has an open bottom side 213 (see FIG. 3). In this embodiment, the connecting seat 21 has a flat top surface 211 formed with, for example, four openings 210 that are in spatial communication with the insertion grooves 212, respectively. It is noted that, when the stroller frame 100 is fully unfolded, the top surface 211 of the connecting seat 211 is substantially horizontal (FIG. 1).

The front and rear bottom rods 22, 23 are arranged radially around the connecting seat 21. Each of the front and rear bottom rods 22, 23 has a first end 221, 231 that is permitted to extend into a corresponding insertion groove 212 in the connecting seat 21 and that is connected pivotally to the connecting seat 21, and a second end 222, 232 that is opposite to the first end 221, 231 (see FIG. 1).

Figure 1A:
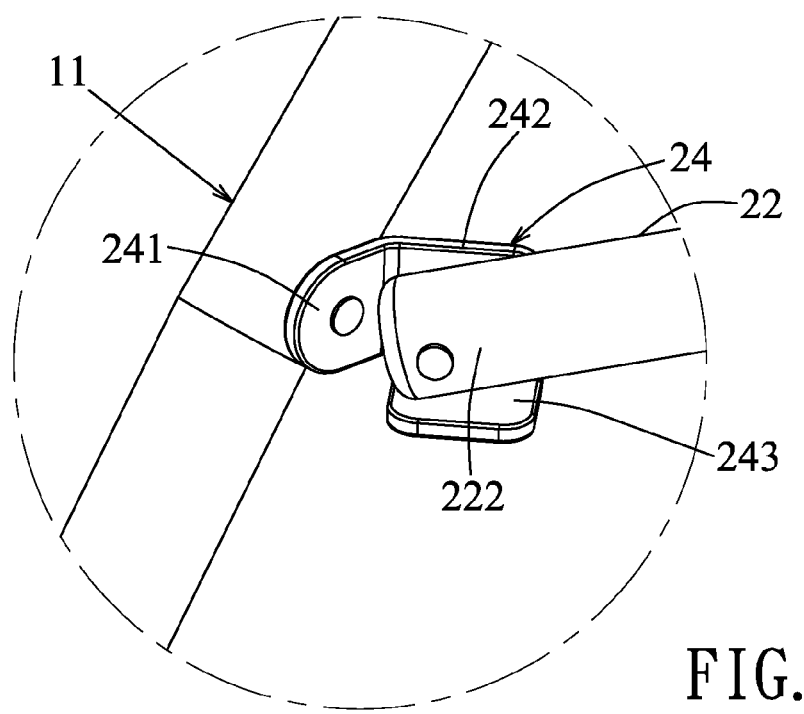
FIGS. 1a, 1b, 1c and 1d are enlarged perspective views of the encircled portions I, II, III, IV of FIG. 1, respectively.
Figure 1B:
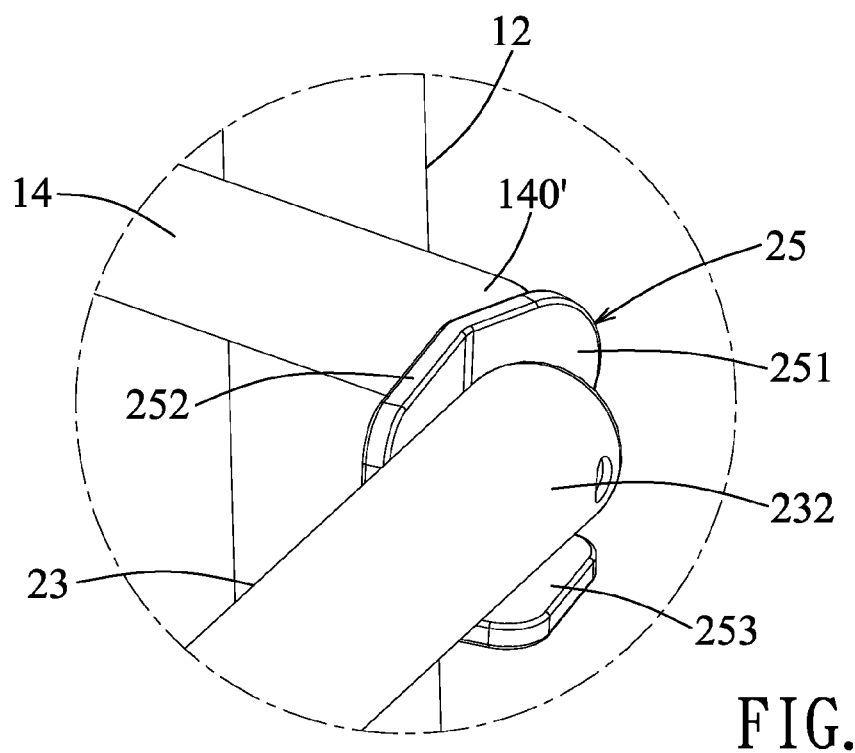

Each front joint piece 24 is used to pivotally joint the second end 222 of a respective front bottom rod 22 to the front leg 11 of a respective side frame unit 1 in a manner that the second end 222 of the respective front bottom rod 22 is disposed between the lower end 110' of the front leg 11 and the upper end 140 of the connecting rod 14 of the respective side frame unit 1. Each rear joint piece 25 is used to pivotally joint the second end 232 of a respective rear bottom rod 23 and the lower end 140' of the connecting rod 14 of a respective side frame unit 1 to the rear leg 12 of the respective side frame unit 1. Referring further to FIGS. 1a and 1b, each of the front and rear joint pieces 24, 25 includes a first pivot plate portion 241, 251, a second pivot plate portion 242, 252 that extends from a lateral end of the first pivot plate portion 241, 251, and a base plate portion 243, 253 that extends horizontally from the bottom of the second pivot plate portion 242, 252. For example, for each of the front and rear joint pieces 24, 25, an appropriate obtuse angle may be formed between the first and second plate portions 241/251, 242/252, and the second pivot plate portion 242, 252 may be perpendicular to the base plate portion 243, 253. For each front joint piece 24, as shown in FIG. 1a, the first pivot plate portion 241 is pivoted to the front leg 11 of the respective side frame unit 1; the second pivot plate portion 242 is pivoted to the second end 222 of the respective front bottom rod 22; and the base plate portion 243 is configured to support the respective front bottom rod 22 thereon when the stroller frame 100 is fully unfolded (see FIG. 1). For each rear joint piece 25, as shown in FIG. 1b, the first pivot plate portion 251, and the lower end 140' of the connecting rod 14 of the respective side frame unit 1 are pivoted to the rear leg 12 of the respective side frame unit 1 in a manner that, for example, the lower end 140' of the connecting rod 14 of the respective side frame unit 1 is disposed between the first pivot plate portion 251 and the rear leg 12 of the respective side frame unit 1; the second pivot plate portion 252 is pivoted to the second end 232 of the respective rear bottom rod 23; and the base plate portion 253 is configured to support the respective rear bottom rod 23 thereon when the stroller frame 100 is fully unfolded (FIG. 1).

Figure 1C:
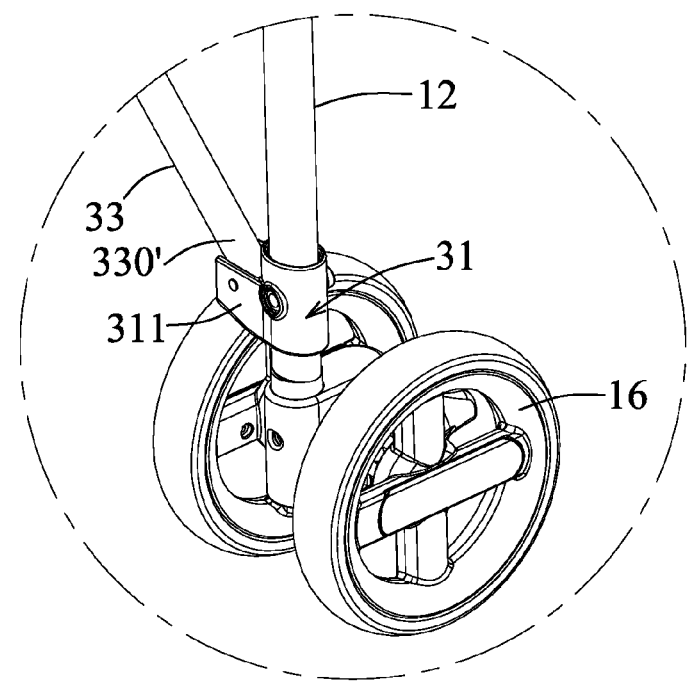
Figure 1D:
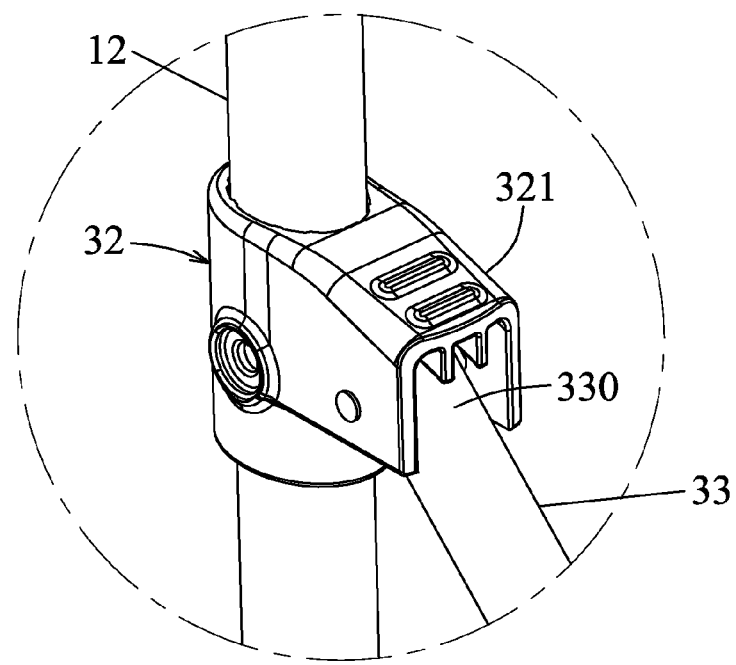

Referring further to FIGS. 1, 1c and 1d, the rear rod assembly 3 interconnects the rear legs 12 of the side frame units 1. The rear rod assembly 3 includes, for example, two rear rods 33 that are pivoted to and cross each other. Each rear rod 33 has opposite upper and lower ends 330, 330' that are connected respectively to the rear legs 12 of the side frame units 1. The upper ends 330 of the rear rods 33 constitute an upper side of the rear rod assembly 3, and the lower ends 330' of the rear rods 33 constitute a lower side of the rear rod assembly 3. The upper side or the lower side of the rear rod assembly 3 is connected slidably to the rear legs 12 of the side frame units 1. In this embodiment, the upper side of the rear rod assembly 3 is connected slidably to the rear legs 12 of the side frame units 1. In other embodiments, each of the upper and lower sides of the rear rod assembly 3 may be connected slidably to the rear legs 12 of the side frame units 1. In addition, each side frame unit 1 further includes, for example, a lower joint seat 31 and an upper joint seat 32 provided on the rear leg 12 in a manner that the upper joint seat 32 is disposed above the lower joint seat 31. Each of the lower and upper joint seats 31, 32 of each side frame unit 1 has a pivot portion 311, 321. In this embodiment, for each side frame unit 1, the lower joint seat 31 is sleeved fixedly on the lower end 120' of the rear leg 12 (see FIGS. 1 and 1c), and the upper joint seat 32 is sleeved slidably on the rear leg 12 such that the upper joint seat 32 is slidable along the rear leg 12. For the rear rod assembly 3, the upper ends 330 of the rear rods 33 are pivoted respectively to the pivot portions 321 of the upper joint seats 32 of the side frame units 1, and the lower ends 330' of the rear rods 33 are pivoted respectively to the pivot portions 311 of the lower joint seats 31 of the side frame units 1. It is noted that, in other embodiments, the lower end 330' of each rear rod 33 of the rear rod assembly 3 may be directly pivoted to the rear leg 12 of a respective side frame unit 1, thereby omitting the lower joint seats 31.

Referring again to FIGS. 1 to 3, to unfold the stroller frame 100, the connecting seat 21 is pushed downwardly to a used position such that the first end 221, 231 of each of the front and rear bottom rods 22, 23 extends into and is restricted in the corresponding insertion groove 212 in the connecting seat 21. During unfolding, the downward movement of the connecting seat 21 drives movement of the front and rear bottom rods 22, 23 in such a way that the second ends 222, 232 of the front and rear bottom rods 22, 23 move radially away from each other until the front and rear bottom rods 22, 23 are fully unfolded with respect to the connecting seat 21 (FIG. 1). Thus, the side frame units 1 are driven by the front and rear bottom rods 22, 23 to move away from each other in the widthwise direction (W), such that the front leg 11 and the handle rod 13 of each side frame unit 1 pivot away from each other, and such that the rear leg 12 and the handle rod 13 of each side frame unit 1 pivot away from each other. It is noted that, during unfolding, the upper joint seat 32 of each side frame unit 1 slides downwardly along the rear leg 12 to a lower limit position at which the stroller frame 100 is fully unfolded (FIG. 1).

To fold the stroller frame 100, the connecting seat 21 is pulled upwardly from the used position such that the first end 221, 231 of each of the front and rear bottom rods 22, 23 moves partially away from the corresponding insertion groove 212 in the connecting seat 21 through the open bottom side 213 of the corresponding insertion groove 212, and is permitted to extend partially into a corresponding opening 210 in the connecting seat 21 (see FIG. 3). During folding, the upward movements of the connecting seat 21 drives movement of the front and rear bottom rods 22, 23 in such a way that the second ends 222, 232 of the front and rear bottom rods 22, 23 move radially toward each other until the front and rear bottom rods 22, 23 are fully folded with respect to the connecting seat 21 (FIG. 3). Thus, the side frame units 1 are driven by the front and rear bottom rods 22, 23 to move toward each other in the widthwise direction (W), such that the front leg 11 and the handle rod 13 of each side frame unit 1 pivot toward each other, and such that the rear leg 12 and the handle rod 13 of each side frame unit 1 pivot toward each other. It is noted that, during folding, the upper joint seat 32 of each side frame unit 1 slides upwardly along the rear leg 12 from the lower limit position to an upper limit position at which the stroller frame 100 is fully folded (see FIG. 3).

In sum, by pulling or pushing the connecting seat 21 with a single hand of an operator, the stroller frame 100 of this invention can be easily folded or unfolded.

FIGS. 4 to 9 illustrates the connection unit 2' of the second embodiment of the foldable stroller frame according to this invention, which is a modification of the first embodiment.

Figure 4:
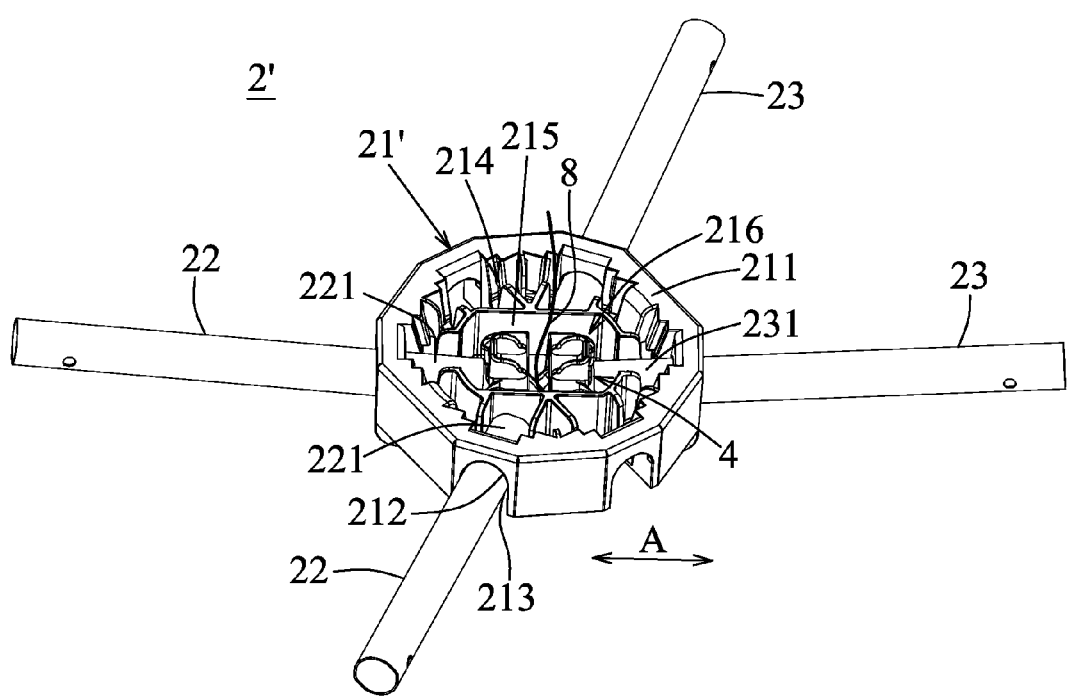
FIG. 4 is a perspective view showing a foldable connection unit of the second embodiment of a foldable stroller frame according the present invention.
Figure 5:
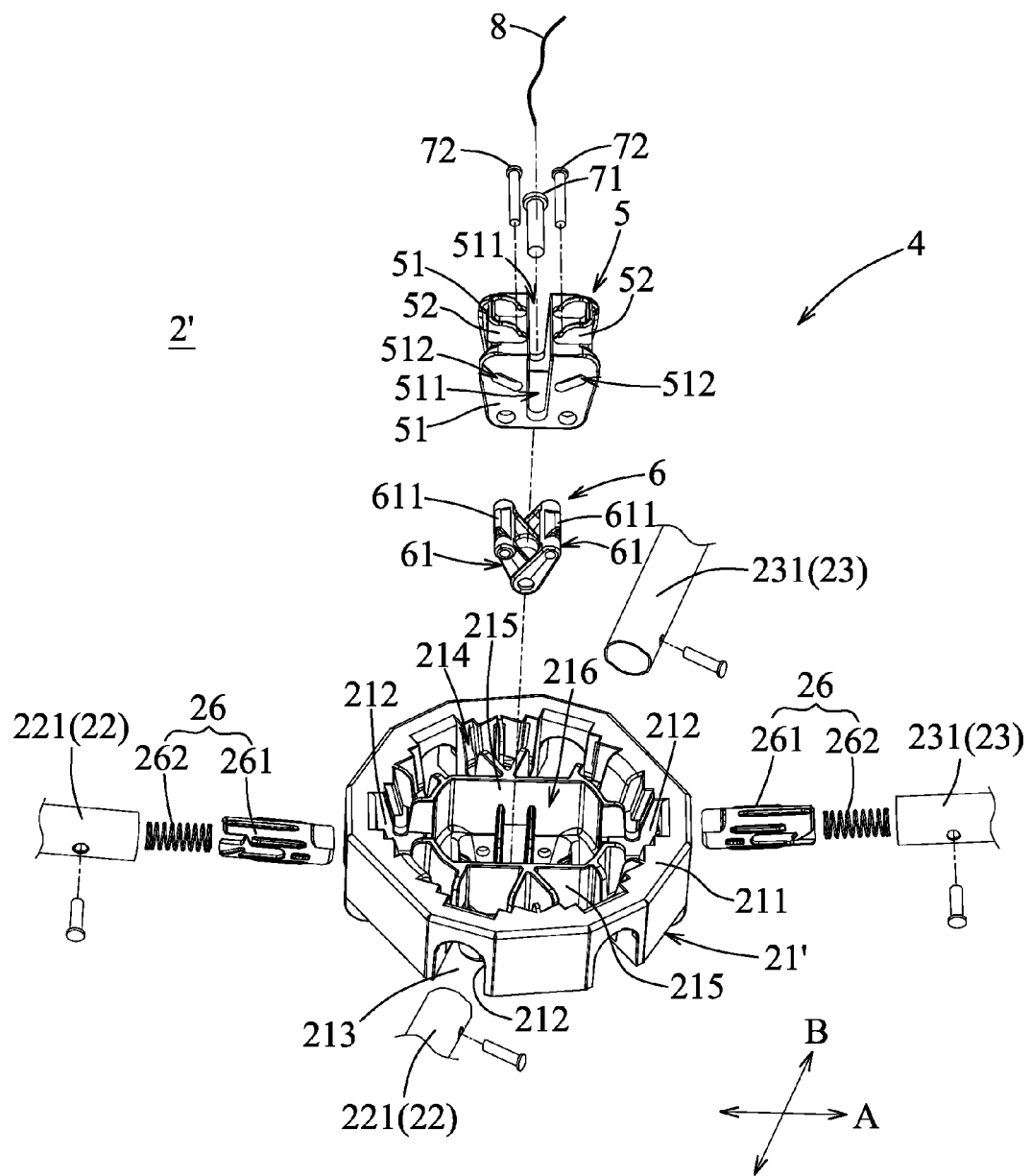
FIG. 5 is an exploded, fragmentary perspective view of the connection unit of the second embodiment.
Figure 6:
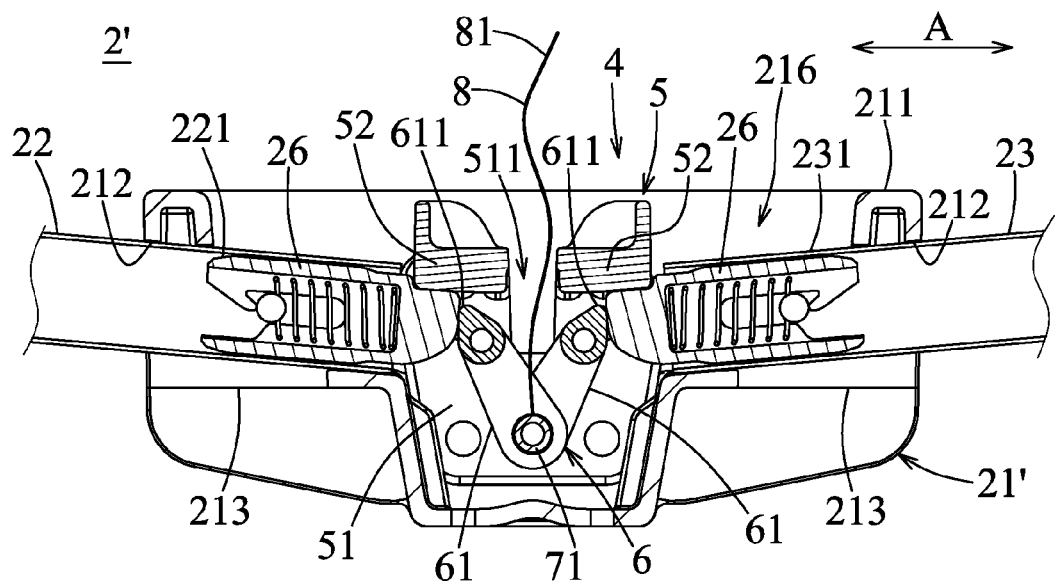
FIG. 6 is a fragmentary, partially sectional view of the connection unit of the second embodiment when a lock mechanism is in a locking state.
Figure 7:
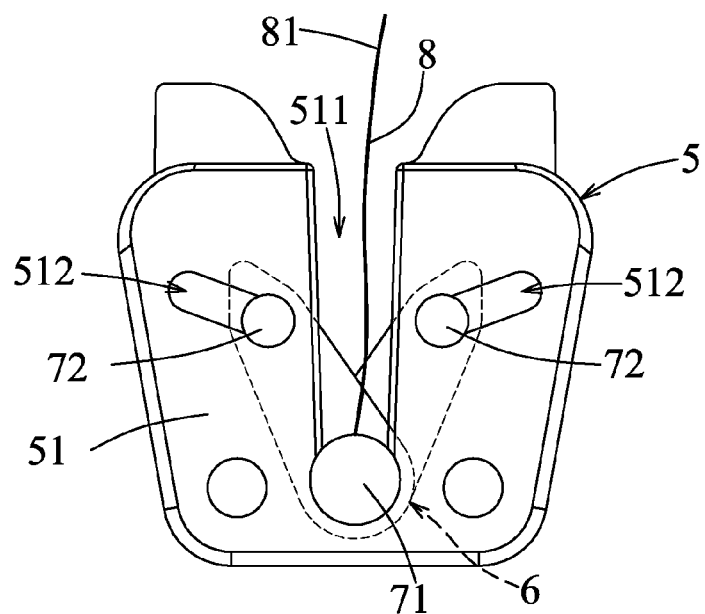
FIG. 7 is a schematic view illustrating the relationship between a locking seat and an unlocking member of the lock mechanism of the second embodiment when the lock mechanism is in the locking state.

Referring to FIGS. 4 and 5, the connection unit 2' differs from the connection unit 2 of the first embodiment (FIG. 1) in that the connecting seat 21' further has a central recess 214 that is formed in the top surface 211 thereof and that is in spatial communication with the insertion grooves 212, and two opposite partition walls 215 that are provided in the central recess 214 to define, within the central recess 214, an accommodating space 216 therebetween. The accommodating space 216 is in spatial communication with two corresponding insertion grooves 212 that are opposite to each other in a first direction (A), i.e., the left and right insertion grooves 212 of FIG. 5.

Figure 8:
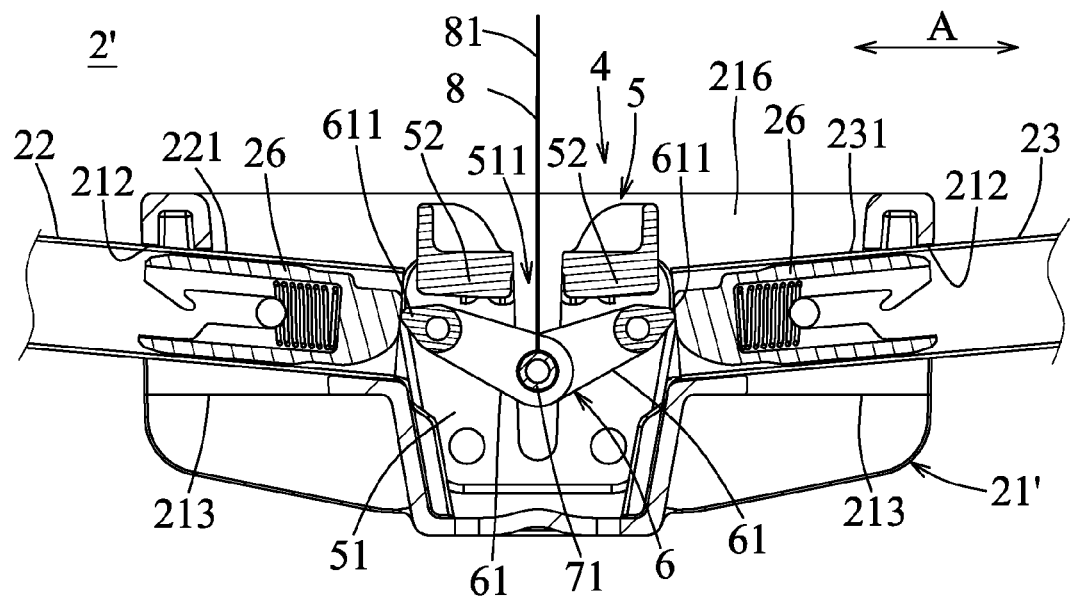
FIG. 8 is a fragmentary, partially sectional view of the connection unit of the second embodiment when the lock mechanism is in an unlocking state.

One front bottom rod 22 and one rear bottom rod 23 that extend respectively into the two corresponding insertion grooves 212 (hereinafter referred as the left bottom rod 22 and the right bottom rod 23, respectively) each have a spring-loaded plug 26 that is provided in the first end 221, 231 thereof and that is movable between a normally projecting position, where the spring-loaded plug 26 partially projects from the first end 221, 231 thereof (see FIG. 6), and a retracted position, where the spring-loaded plug 26 is fully retracted in the first end 221, 231 thereof (see FIG. 8). In this embodiment, each spring-loaded plug 26 consists of a hollow plug body 261, and a coil spring 262 received in the plug body 261.

In addition, the connection unit 2' further includes a lock mechanism 4 that is disposed in the accommodating space 216 in the connecting seat 21'. When the first end 221, 231 of each of the front and rear bottom rods 22, 23 extends into and is restricted in the corresponding insertion groove 212 (FIG. 4), i.e., the stroller frame 100 (see FIG. 1) is fully unfolded, the lock mechanism 4 is operable in one of a locking state (FIG. 6), where the spring-loaded plug 26 of each of the left and right bottom rods 22, 23 is at the projecting position and is engaged with the lock mechanism 4 such that the first ends 221, 231 of the left and right bottom rods 22, 23 are locked in the connecting seat 21', and an unlocking state (FIG. 8), where the spring-loaded plug 26 of each of the left and right bottom rods 22, 23 is urged by the lock mechanism 4 to move from the projecting position to the retracted position, thereby disengaging from the lock mechanism 4 such that each of the left and right bottom rods 22, 23 is able to pivot with respect to the connecting seat 21'.

In this embodiment, the lock mechanism 4 includes a hollow locking seat 5, an unlocking member 6 and an operation piece 8.

The locking seat 5 is fixed to the partition walls 215, and is used to engage the spring-loaded plug 26 of each of the left and right bottom rods 22, 23 when the stroller frame is fully unfolded while the lock mechanism 4 is in the locking state. The locking seat 5 includes two upright plate portions 51, and two opposite top blocks 52. The plate portions 51 are opposite to each other in a second direction (B) perpendicular to the first direction (A), and are connected respectively to the partition walls 216. Each plate portion 51 has a central slot 511 that extends vertically and downwardly from a top side thereof, and two inclined guide grooves 512 that are symmetric with respect to and inclined downwardly toward the central slot 511. The top blocks 52 are connected integrally between the top sides of the plate portions 51, and are spaced apart from each other in the first direction (A). When the stroller frame is fully unfolded and when the lock mechanism 4 is in the locking state, the spring-loaded plug 26 of each of the left and right bottom rods 22, 23 abuts against a bottom side of a respective top block 52, thereby prohibiting the left and right bottom rods 22, 23 from pivoting.

Figure 9:
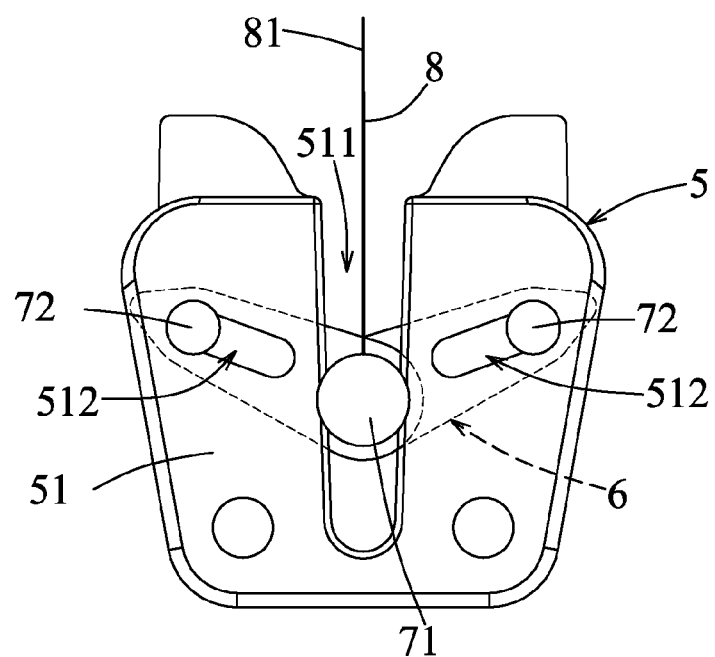
FIG. 9 is a schematic view illustrating the relationship between the locking seat and the unlocking member of the second embodiment when the lock mechanism is in the unlocking state.

The unlocking member 6 is disposed in and connected movably to the locking seat 5 for driving the spring-loaded plug 26 of each of the left and right bottom rods 22, 23 to move from the projecting position to the retracted position when the stroller frame is fully unfolded while the lock mechanism 4 is in the unlocking state. The unlocking member 6 includes two inverted U-shaped arms 61 that are pivoted to each other through a first pivot bolt 71, which passes through and engages slidably the central slots 511 of the plate portions 51 of the locking seat 5. Each arm 61 has an intermediate arm section 611 pivoted to a respective second pivot bolt 72 that passes through and engages slidably a respective guide groove 512 in each plate portion 51 of the locking seat 5. Thus, the unlocking member 6 is movable along the central slots 511 of the locking seat 5 between a lower limit position (FIG. 7) and an upper limit position (FIG. 9). When the unlocking member 6 moves from the lower limit position to the upper limit position, the intermediate arm sections 611 of the arms 61 are guided by the inclined guide grooves 512 of the locking seat 51 to move away from each other such that the spring-loaded plug 26 of each of the left and right bottom rods 22, 23 is pushed by the intermediate arm section 611 of a respective arm 61 to move to the retracted position.

The operation piece 8, for example, a pulling cord, is connected to the first pivot bolt 71, and has an operating end 81 that is exposed out of the connecting seat 21' (see FIGS. 6 and 8) and that is manually operable to move the unlocking member 6 to the upper limit position.

Due to the presence of the lock mechanism 4, the first ends 221, 231 of the left and right bottom rods 22, 23 are normally locked in the connecting seat 21' once the stroller frame is fully unfolded, thereby maintaining the stroller frame in a fully unfolded state. When the fully unfolded stroller frame is to be folded, by pulling upwardly the operating piece 8 with a single hand of the operator, the first ends 221, 231 of the left and right bottom rods 22, 23 are first released from the locking seat 5 of the lock mechanism 4 such that the left and right bottom rods 22, 23 are able to pivot with respect to the connecting seat 21', and the connecting seat 21' then moves upwardly due to the pulling force applied to the operating piece 8. Accordingly, the stroller frame is folded. Therefore, the entire folding operation of the stroller frame of this invention can be performed by one hand.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A foldable stroller frame comprising:
   two opposite foldable side frame units spaced apart from each other in a widthwise direction of said stroller frame, each of said side frame units including
      a front leg,
      a handle rod having a pivot end that is connected pivotally to said front leg, and a handle end that is opposite to said pivot end, and
      a rear leg having an upper end that is connected pivotally to said handle rod; and
   a foldable connection unit interconnecting said side frame units and including
      a connecting seat, and
      two hollow front bottom rods and two hollow rear bottom rods arranged radially around said connecting seat, each of said front and rear bottom rods having a first end that extends into and is connected pivotally to said connecting seat, and a second end that is opposite to said first end, said second end of each of said front bottom rods being connected pivotally to said front leg of a respective one of said side frame units, said second end of each of said rear bottom rods being connected pivotally to said rear leg of a respective one of said side frame units;
   wherein, to unfold said stroller frame, said connecting seat is pushed downwardly to a used position so as to drive said second ends of said front and rear bottom rods to move radially away from each other such that said side frame units are driven by said front and rear bottom rods to move away from each other in the widthwise direction, such that said front leg and said handle rod of each of said side frame units pivot away from each other and such that said rear leg and said handle rod of each of said side frame units pivot away from each other;
   wherein, to fold said stroller frame, said connecting seat is pulled upwardly from the used position so as to drive said second ends of said front and rear bottom rods to move radially toward each other such that said side frame units are driven by said front and rear bottom rods to move toward each other in the widthwise direction, such that said front leg and said handle rod of each of said side frame units pivot toward each other and such that said rear leg and said handle rod of each of said side frame units pivot toward each other;
   wherein said connecting seat of said connection unit has a plurality of spaced apart and radially extending insertion grooves that are formed in an outer surrounding side thereof and that are arranged in a centrally symmetric manner, each of said insertion grooves having an open bottom side;
   wherein, when said stroller frame is fully unfolded, said first end of each of said front and rear bottom rods extends into and is restricted in a corresponding one of said insertion grooves;
   wherein said connecting seat further has a central recess that is formed in a top side thereof and that is in spatial communication with said insertion grooves, and two opposite partition walls that are provided in said central recess to define, within said central recess, an accommodating space therebetween, said accommodating space being in spatial communication with two corresponding ones of said insertion grooves that are opposite to each other in a first direction;
   wherein one of said front bottom rods and one of said rear bottom rods that extend respectively into said two corresponding ones of said insertion grooves each have a spring-loaded plug that is provided in said first end thereof and that is movable between a normally projecting position and a retracted position;
   wherein said connection unit further includes a lock mechanism that is disposed in said accommodating space in said connecting seat; and
   wherein, when said stroller frame is fully unfolded, said lock mechanism is operable in one of a locking state, where said spring-loaded plug of each of said one of said front bottom rods and said one of said rear bottom rods is at the projecting position and is engaged with said lock mechanism such that said first ends of said one of said front bottom rods and said one of said rear bottom rods are locked in said connecting seat, and an unlocking state, where said spring-loaded plug of each of said one of said front bottom rods and said one of said rear bottom rods is urged by said lock mechanism to move from the projecting position to the retracted position, thereby disengaging from said lock mechanism such that each of said one of said front bottom rods and said one of said rear bottom rods is able to pivot with respect to said connecting seat.

2. The foldable stroller frame as claimed in claim 1, wherein said lock mechanism includes:
   a hollow locking seat fixed to said partition walls, said locking seat engaging said spring-loaded plug of each of said one of said front bottom rods and said one of said rear bottom rods at the projecting position when said stroller frame is fully unfolded while said lock mechanism is in the locking state; and
   an unlocking member disposed in and connected movably to said locking seat for driving said spring-loaded plug of each of said one of said front bottom rods and said one of said rear bottom rods to move from the projecting position to the retracted position when said stroller frame is fully unfolded while said lock mechanism is in the unlocking state.

3. The foldable stroller frame as claimed in claim 2, wherein:

said locking seat has
two upright plate portions that are opposite to each other in a second direction perpendicular to the first direction and that are connected respectively to said partition walls, each of said plate portions having a central slot that extends vertically and downwardly from a top side thereof, and two inclined guide grooves that are symmetric with respect to and inclined downwardly toward said central slot, and
two opposite top blocks that are connected integrally between said top sides of said plate portions and that are spaced apart from each other in the first direction, said spring-loaded plug of each of said one of said front bottom rods and said one of said rear bottom rods abutting against a bottom side of a respective one of said top blocks when said stroller frame is fully unfolded and when said lock mechanism is in the locking state;

said unlocking member includes two inverted U-shaped arms that are pivoted to each other through a first pivot bolt, which passes through and engages slidably said central slots of said plate portions of said locking seat, each of said arms having an intermediate arm section pivoted to a respective second pivot bolt that passes through and engages slidably a respective one of said guide grooves in each of said plate portions of said locking seat, said unlocking member being movable along said central slots of said locking seat between a lower limit position and an upper limit position; and when said unlocking member moves from the lower limit position to the upper limit position, said intermediate arm sections of said arms are guided by said inclined guide grooves of said locking seat to move away from each other such that said spring-loaded plug of each of said one of said front bottom rods and said one of said rear bottom rods is pushed by said intermediate arm section of a respective one of said arms to move to the retracted position.

4. The foldable stroller frame as claimed in claim 3, wherein said lock mechanism further includes an operation piece that is connected to said first pivot bolt and that has an operating end that is exposed out of said connecting seat and that is manually operable to move said unlocking member to the upper limit position.

\* \* \* \* \*